United States Patent [19]

Sherwood

[11] 3,972,193
[45] Aug. 3, 1976

[54] METHOD FOR PRODUCING MECHANICAL ENERGY FROM GEOTHERMAL BRINE

[75] Inventor: Thomas K. Sherwood, Berkeley, Calif.
[73] Assignee: Union Oil Company of California, Brea, Calif.
[22] Filed: July 1, 1975
[21] Appl. No.: 592,258

[52] U.S. Cl. .................................. 60/641; 165/45
[51] Int. Cl.² ........................................ F03G 7/00
[58] Field of Search ....................... 60/641; 165/45

[56] References Cited
UNITED STATES PATENTS

| | | | |
|---|---|---|---|
| 3,757,516 | 9/1973 | McCabe | 165/45xr |
| 3,824,793 | 6/1974 | Matthews | 60/641 |
| 3,845,627 | 11/1974 | Hutchinson | 165/45xr |
| 3,846,986 | 11/1974 | Anderson | 60/641 |

Primary Examiner—Allen M. Ostrager
Attorney, Agent, or Firm—Richard C. Hartman, Dean Sandford, and John E. Vanderburgh

[57] ABSTRACT

A method for producing mechanical energy from geothermal brine in which the brine is flowed successively through a series of flash stages which are maintained at successively lower pressures so that the brine is partially flashed to vapor in each stage, a working fluid is countercurrently flowed through the series of successive flash stages in indirect heat exchange with the vapor produced in each stage so that the vapor condenses in each flash stage and the working fluid is progressively heated as it passes through the series of flash stages, and utilizing the heated working fluid in a heat engine for the production of mechanical energy.

22 Claims, 7 Drawing Figures

METHOD FOR PRODUCING MECHANICAL ENERGY FROM GEOTHERMAL BRINE

BACKGROUND OF THE INVENTION

1. Field of the Invention

This invention relates to a method for utilizing thermal energy found beneath the surface of the earth to produce mechanical energy, and particularly to an improved method for utilizing the heat content of geothermal brine to generate electricity.

2. Description of the Prior Art

Sources of geothermal energy are found in many parts of the world, and while a few of these sources provide dry steam which is particularly useful for the production of useful energy, and some may provide wet steam, the remaining sources provide only hot geothermal brine. Because geothermal brines contain significant amounts of dissolved and suspended solids, past attempts to utilize these brines in the production of useful energy have been of only limited success because of the problems of scaling, plugging and corrosion of process equipment.

In one method for utilizing geothermal brine to produce mechanical energy, the hot geothermal brine is heat exchanged with a working fluid in conventional heat exchange equipment in which both the brine and the working fluid directly contact the heat exchange surfaces; however, due to the direct contact of the brine, extensive corrosion and fouling of the heat exchanger will result. Another method involves producing vapor from the brine by flashing the brine at the surface or allowing it to flash as it is produced. This vapor is then fed to a turbine for the production of mechanical energy. The disadvantage of this method is that the brine-produced vapor will unavoidably carry entrained salts and other solids to the turbine, causing scaling and corrosion. Also, the unflashed, residual brine will still contain a large amount of unrecovered thermal energy; and furthermore, because of the removal of vapor, the salt and solids content of the brine will increase, causing more precipitation, scaling, and corrosion.

Thus, there is a need for a method of producing mechanical energy which utilizes geothermal brine, and which can do so without the attendant problems of corrosion, scaling, and precipitation associated with prior methods.

A device that has been successfully used in the desalination of sea water is the multistage flash heat exchanger, and recently it has been suggested to use multistage flash heat exchangers to produce fresh water from geothermal brine or to cool geothermal brine used in other processes. In Geothermal Energy, Stanford University Press, 1973, at pages 187–189, the use of a multistage flash heat exchanger to desalinate geothermal brine is discussed; and in "Ranking Research Problems in Geothermal Development" by Alan D. K. Laird, U.S. Department of the Interior, Research and Development Progress Report No. 711, August 1971, pages 16–17, the use of a multistage flash heat exchanger for cooling brine that has previously been flashed to steam for the generation of power is described.

I have now discovered that by utilizing a multistage flash heat exchanger in the production of mechanical energy from geothermal brine, the above-described problems of scaling, plugging, and corrosion of process equipment can be substantially reduced. These benefits result from the fact that brine-produced vapors will not be fed into the heat engine and that hot geothermal brine will not directly contact heat exchange surfaces; but instead, the vapor produced in each stage of the multistage flash heat exchanger will be used to heat a working fluid which is conducted through the vapor space of the heat exchanger and which then is utilized in a heat engine for the production of mechanical energy.

Accordingly, a principal object of this invention is to provide a method for producing mechanical energy from geothermal brine without the deleterious effects of corrosion, scaling, and plugging due to suspended solids and dissolved salts.

Another object of this invention is to provide a method for producing mechanical energy from geothermal brine which does not require the brine to contact a heat exchange surface.

Yet another object of this invention is to provide a method for producing mechanical energy which does not feed brine-produced vapors to the heat engine.

A further object of this invention is to provide a method for recovering the thermal energy contained in hot geothermal brine and utilizing the recovered thermal energy to produce mechanical energy.

A still further object of this invention is to provide a method for producing mechanical energy from geothermal brine which utilizes a working fluid which is heated to a temperature near the temperature of the produced brine.

Further objects and advantages of this invention will be apparent to those skilled in the art from the following description.

SUMMARY OF THE INVENTION

Briefly, the method of this invention comprises the steps of producing hot geothermal brine from a subterranean geothermal reservoir; passing the brine successively through a series of separate flash stages, each successive stage being maintained at a lower pressure less than the vapor pressure of the brine entering that stage so that the brine is partially flashed to vapor in each stage; countercurrently flowing a working fluid successively through said series of flash stages in indirect heat exchange with the vapor produced in each flash stage so that the vapor condenses in each flash stage and the working fluid is progressively heated as it passes through the series of flash stages; and, then, utilizing the heated working fluid in a heat engine for the production of mechanical energy. Exemplary heat engines include steam turbines, steam engines, gas turbines, and other prime movers capable of utilizing a heated working fluid in the production of mechanical energy. In the most practical application of this invention, a turbine will be used to produce the mechanical energy to drive an electrical generator for the production of electrical power.

This invention provides the important advantage of not allowing the hot geothermal brine to directly contact a heat exchange surface. Another important advantage of this invention is that mechanical energy can be produced without having brine-produced vapors fed to the heat engine. A further advantage of this invention is that the working fluid can be heated to a temperature very near the temperature of the produced geothermal brine. This is accomplished through the use of incremental pressure reductions in each successive flash stage. Because of the incremental reductions in pressure, the temperature of the brine is also only incrementally reduced, thereby allowing the countercurrently flowing working fluid to be progressively heated to a temperature near the temperature of the produced geothermal brine.

BRIEF DESCRIPTION OF THE DRAWINGS

The invention will be more readily understood by reference to the accompanying drawings wherein like numerals refer to like elements and wherein.

DETAILED DESCRIPTION

Figure 1:
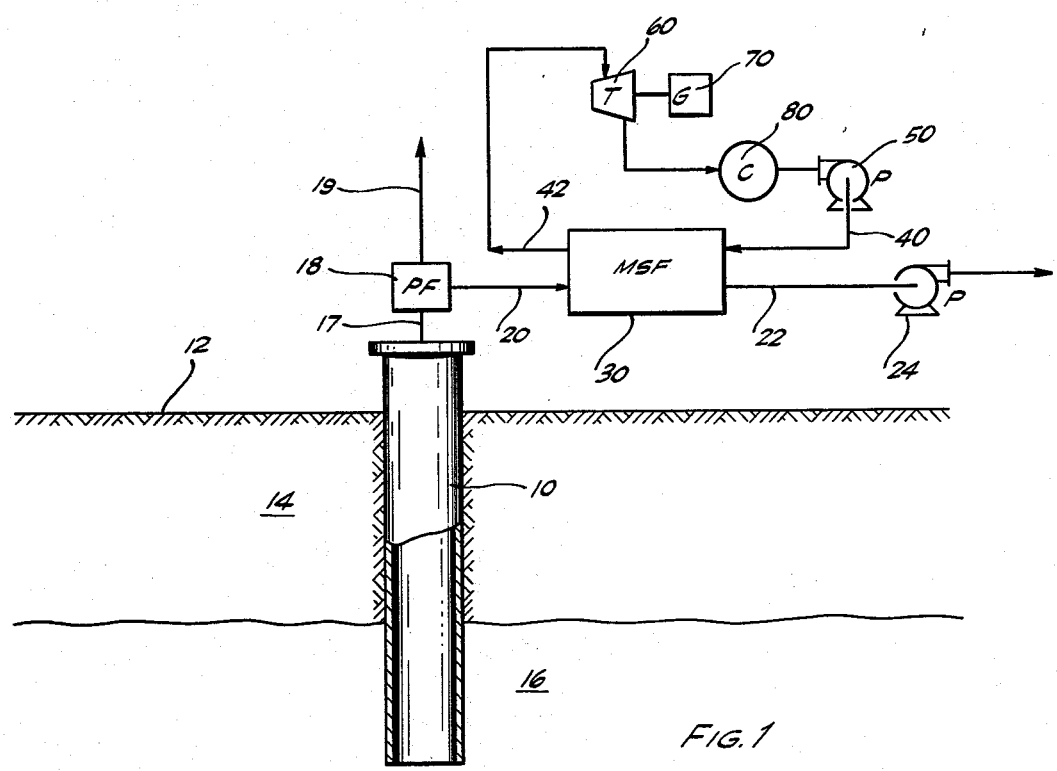
FIG. 1 is a schematic flow diagram of a process employing the method of this invention.

The method of this invention, as hereinafter described in greater detail, provides for the production of mechanical energy from geothermal brine. The method involves first producing the hot geothermal brine from a subterranean geothermal brine reservoir via one or more production wells. Geothermal brine reservoirs are found at varying depths, most ranging from 1,000 feet to 5,000 feet, or deeper; and the temperature of the brine can vary from ambient temperature to about 700° F. or higher, with many reservoirs containing brine having temperatures in the range of 250° F. to 700° F.

Several methods can be employed to deliver the geothermal brine to the surface. Although the pressures within the geothermal brine reservoirs are high, they are typically insufficient to naturally flow the brine to the surface; therefore, either a surface or downhole pump may be required to produce the geothermal brine. It may be desirable, once the flow of brine is initiated and the hotter brine is subjected to the lower pressures in the upper portion of the well, to allow the brine to partially flash so as to help sustain the upward flow of brine. With whatever method is selected, a pressure control valve, in conjunction with a steam separator, may be used to control the pressure of the brine produced at the surface and the amount of brine that is allowed to flash into steam. Because allowing the brine in the production well to flash results in a substantial decrease in the temperature of the recoverable heat and energy, and the precipitation and deposit of minerals, and because it is preferred to produce as much brine as possible at the highest temperature with no precipitation of minerals, the amount of brine that flashes should be kept to a minimum. Therefore, it is preferred to produce the hot geothermal brine at a superatmospheric pressure exceeding its vapor pressure to maintain the brine in the liquid phase.

Once brought to the surface, if the pressure of the produced geothermal brine is too high for use in the available heat exchanger, the brine can be partially flashed to vapor prior to its introduction into the heat exchanger in order to reduce the pressure of the brine. The residual brine from the partial flashing can then be introduced into the heat exchanger. However, because the maximum temperature to which the working fluid can be raised is limited by the temperature of the vapor in the first flash stage, it is desirable to have the brine delivered to the heat exchanger at the highest temperature possible. Therefore, it is preferred to conduct the produced geothermal brine to the heat exchanger at a pressure exceeding its vapor pressure to maintain the brine in the liquid phase.

The temperature of the brine entering the first flash stage of the heat exchanger may range from about 250° F. to about 650° F. or above, and typically from about 350° F. to about 500° F. Naturally, the pressure of the liquid brine will be above its vapor pressure. The first flash stage is maintained at a pressure less than the vapor pressure of the entering brine. As a result, the incoming brine partially flashes, producing vapor and brine, both at a new lower temperature. The vapor contacts and condenses upon the surface of a heat exchange conduit which passes through the vapor space of the flash stage and which countercurrently conducts the cooler working fluid through the multistage flash heat exchanger. By condensing on the surface of the heat exchange conduit, the vapor yields its heat of condensation to the cooler working fluid by indirect heat exchange. Because essentially pure vapor contacts the heat exchange conduit, and not brine, scaling and corrosion of the heat exchange conduit is substantially eliminated. The condensed vapor is then allowed to drip down and recombine with the brine and flow to the second flash stage which is maintained at a pressure lower than the first flash stage and lower than the vapor pressure of the brine entering the second stage; and the above-described flashing-condensation process repeats. Because the condensed vapor is allowed to drip down and recombine with the brine, the salt and mineral concentration of the brine is not increased; thereby greatly reducing the problem of precipitation of salts and solids, and the plugging that would result.

In some circumstances, and particularly when the brine used is relatively low in salt and mineral content, all or a portion of the condensed vapor can be collected in each flash stage and recovered as fresh water. However, it may be desirable to collect the condensed vapor from only a limited number of flash stages, and to allow the condensed vapors to recombine with the brine in the other stages of the heat exchanger to prevent the precipitation of salt and minerals.

The quantity and temperature of the vapor produced in each flash stage will depend on how much the pressure in the flash stage is below the vapor pressure of the incoming brine. It is desired in the practice of this invention to produce vapor at the highest possible temperature, thereby enabling the working fluid to be heated to the highest possible temperature. This is accomplished by passing the brine successively through a series of flash stages wherein the pressure of the brine is reduced in small increments rather than in one large drop. While the total quantity of energy provided by one large pressure drop may be equal to that provided by a series of incremental pressure drops, reduction of the pressure in a series of incremental pressure drops provides that energy at much higher temperatures, thus enabling the working fluid to be heated to the highest possible temperature. Because of the countercurrent flow of the working fluid, it will always have a temperature lower than the vapor temperature in the same flash stage, thus facilitating both condensation of the vapor and heat transfer to the working fluid. This process can be repeated in successive steps until the temperature of the vapor approaches the initial temperature of the working fluid.

While the first flash stage is preferably above atmospheric pressure, the latter flash stages of the heat exchanger can be maintained at subatmospheric pressures. In fact, this is preferred. Because it is desired to bring the temperature of the vapor down to near the initial temperature of the working fluid which is typically below the boiling point of the effluent brine, it will be necessary to flash the brine at subatmospheric pressure in the latter stages. When the pressure in the last flash stage is maintained at subatmospheric pressure, it will be necessary to pump the brine from the last stage.

It is preferred in the practice of this invention that the flash stages be free of all gases except for the flashed vapor. It may be necessary before or during start-up of the process to evacuate the vapor spaces by means of vents at the top of the vapor space. As the brine flashes during the operation of the process these vents may be used to assist in regulating the pressure within each stage.

The working fluid can be any of a wide variety of fluids, such as water; a low molecular weight hydrocarbon such as methane, ethane, propane, butane, isobutane, pentane, isopentane; ethylene glycol; ammonia; or a fluorinated hydrocarbon. The working fluid can also be a binary fluid. A binary fluid, as defined herein, is a mixture of two or more fluids which boils over a range of temperatures, boiling beginning at its bubble point and vaporization being complete at its dew point. Because the temperature of the binary fluid continuously increases as the fluid boils rather than undergoing a period of constant-temperature boiling, a more uniform temperature differential between the fluid and the geothermal brine can be maintained, thereby allowing the fluid to be heated to a higher temperature. Conversely, because a binary fluid condenses over a range of decreasing temperatures rather than at a constant temperature, thereby providing a more uniform temperature differential between it and the cooling fluid, the amount of cooling fluid required and the size of the condenser can be reduced. Exemplary binary fluids include a mixture of two or more of the fluorinated hydrocarbons, a mixture of butane and pentane, or a mixture of methane, ethane and butane. One preferred binary fluid is a mixture of water and ammonia, such as a mixture containing about 20 percent ammonia and 80 percent water. Regardless of the specific fluid chosen, it is preferred that the fluid have a low-salt content, such as less than 100 ppm of total dissolved salts. If a high-salt content fluid were chosen, such as brine, severe plugging and corrosion would occur within the heat exchange tubes and the heat engine. The working fluid will be selected for optimum performance in view of the available brine temperature, and the heat engine chosen.

The fluid leaving the heat exchanger may be a liquid, a vapor, a liquid-vapor mixture, or a superheated vapor; however, because the preferred heat engine is a turbine, it is preferred that at least a portion of the working fluid be vaporized in the heat exchanger, and more preferably that the working fluid leave the heat exchanger as a superheated vapor.

Referring now to the drawings, FIG. 1 illustrates one embodiment of the method of this invention. As shown in FIG. 1, geothermal brine production well 10 extends from the earth's surface 12, through earth formation 14, and into geothermal brine reservoir 16, which contains hot geothermal brine. Earth formation 14 is typically of low permeability, which therefore retains the hot geothermal brine and prevents the diffusion of heat throughout the formation.

The geothermal brine is delivered to the surface through production well 10 by a subsurface pump, not shown, and is maintained at a pressure exceeding its vapor pressure to prevent flashing within the reservoir or in the production well. The subsurface pump, mentioned above, serves to provide the necessary pressure to prevent flashing and maintain the brine in the liquid phase. By preventing flashing in the well, heat and temperature losses can be kept to a minimum. Also, the deposition of any substantial mineral deposits in the well can be prevented.

At the surface, the geothermal brine is conducted by conduit 17 to optional preflash unit 18 which allows the brine to partially flash, reducing the pressure of the brine to the extent necessary to avoid overpressuring the multistage flash heat exchanger. The flashed vapor is discharged through conduit 19, and the remaining brine is conducted by brine inlet conduit 20 to multistage flash heat exchanger (MSF) 30. The brine flows through the MSF, wherein a significant portion of its heat is transferred to the working fluid which flows countercurrently through the vapor space of the MSF. The brine at a lower temperature and pressure, exits the MSF through brine outlet conduit 22, with the aid of pump 24 if necessary, for suitable disposal. If desired, the brine can be injected back into the geothermal brine reservoir through an injection well, not shown, in order to replenish the supply of brine and/or to prevent land subsidence. If the brine is injected back into the reservoir, it should be done a substantial distance from the production well so as not to overly cool the brine that is being produced.

Also shown in FIG. 1 is a closed working fluid circuit. The working fluid is pumped by pump 50 through fluid inlet conduit 40 into the MSF. The fluid is then conducted by one or more heat exchange conduits through the vapor space of the MSF wherein the fluid is vaporized for use in a turbine. The vaporized working fluid exits the MSF through fluid outlet conduit 42, and is conducted to turbine 60 which produces the mechanical energy necessary to drive generator 70 for the generation of electrical power. The spent fluid exits turbine 60 and flows through condenser 80 and back to pump 50 for recycling.

The multistage flash heat exchanger (MSF) used in the method of this invention can be constructed in many ways. Essentially, it consists of a series of separate flash stages through which the brine successively flows. Liquid passages connect adjacent stages and are so disposed as to prevent vapor communication between adjacent stages. The necessary pressure differential between adjacent stages is provided by pressure control devices. The MSF also includes one or more heat exchange conduits which successively pass through the series of flash stages in order to contact the vapor in each flash stage. The heat exchange conduits are so disposed that the hot geothermal brine does not contact the heat exchange surface, the working fluid flowing countercurrently through the heat exchange conduit being progressively heated by indirect heat exchange with the vapor in each flash stage.

Figure 2:
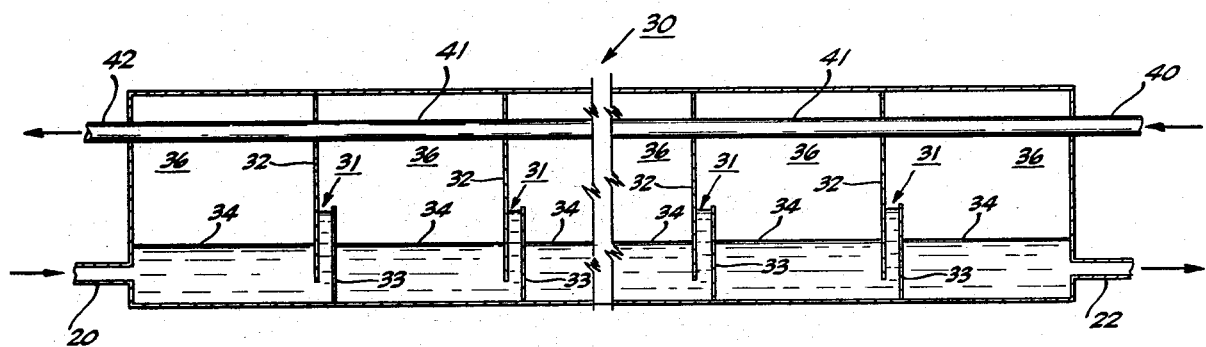
FIG. 2 is a vertical cross-sectional view of one embodiment of the multistage flash heat exchanger useful in the practice of the method of this invention.

FIG. 2 illustrates one embodiment of the MSF for multistage flashing of the brine. Multistage flash heat exchangers are well-known in the art of saltwater desalination, wherein seawater is conducted by conduits passing through the vapor space of a multistage flash unit to preheat the seawater, which then is heated by an external source and flowed through the multistage flash unit, whereby the heated seawater flashes and condenses on the conduit conducting the colder seawater. The condensate is then collected as the fresh water product. U.S. Patent No. 3,152,053 to J. P. Lynam illustrates the use of a multistage flash unit in seawater desalination.

MSF 30, as shown in FIG. 2, is a long tunnel-like structure, and is constructed of concrete, coated metal, or other material suitable for use with hot geothermal brine. The MSF comprises a series of longitudinally disposed flash chambers 36. The liquid passages and pressure control devices are provided by weir-type gates 31 located at the bottom of each chamber. Partitions 32 separating the chambers, extend from the top of each chamber to a point near the bottom, below brine level 34. Weirs 33, positioned a short distance downstream from partitions 32, extend from the bottom of each chamber to an intermediate point above brine level 34. The weir-type gates between adjacent chambers provide the liquid seal which prevent vapor communication between adjacent chambers, and provide the column of brine to maintain the pressure differential between the chambers necessary to cause flashing. Since it is the column of brine that exerts the hydrostatic pressure on the upstream chamber, the pressure differential can be adjusted by raising or lowering the height of weir 33. Because at higher temperatures a greater pressure reduction is required to produce a given temperature drop, the height of the weirs in the early stages may need to be greater than those in the later stages, or it may be preferred to avoid the need for large pressure reductions by having the brine undergo small temperature reductions in the early stages, with the temperature reductions becoming larger as the brine flows through successive stages. If a uniform temperature reduction in each stage is desired, then the first stage will require the highest weir, with each stage thereafter having progressively lower weirs. However, while it may be preferred to have uniform temperature reduction in each stage, this is not necessary. One important feature of this invention is the use of small temperature reductions in each stage so that the working fluid is progressively heated to the highest possible temperature.

Also shown in FIG. 2 is fluid inlet conduit 40, heat exchange conduit 41 passing successively through the vapor space of each flash chamber, and fluid outlet conduit 42. One or more conduits can be utilized and their design and configuration are a matter of choice dependent upon the temperatures encountered, the working fluid used, and the type of heat engine used.

Figure 3:
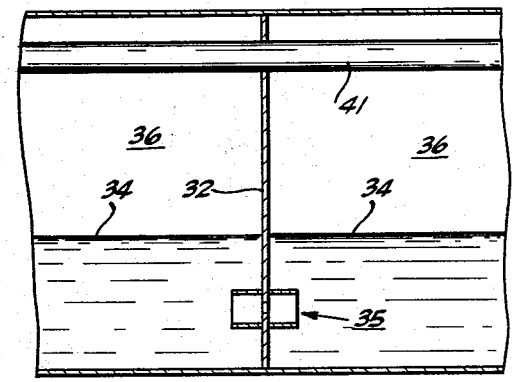
FIG. 3 is a vertical cross-sectional view of a portion of a multistage flash heat exchanger particularly illustrating another embodiment of the pressure control device.
Figure 4:
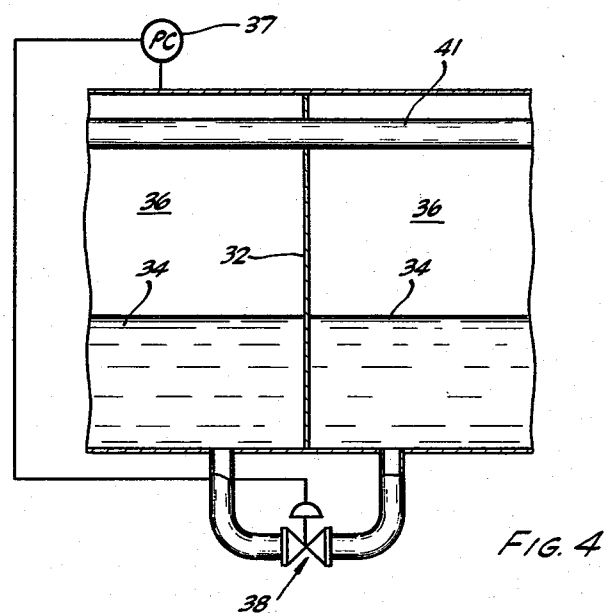
FIG. 4 is a vertical cross-sectional view of a portion of a multistage flash heat exchanger particularly illustrating still another embodiment of the pressure control device.
Figure 5:
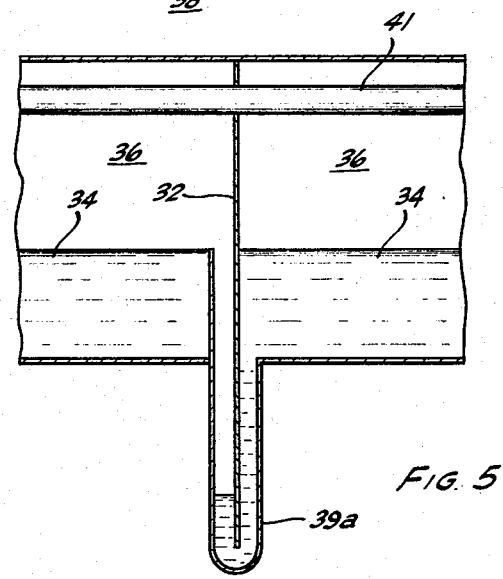
FIG. 5 is a vertical cross-sectional view of a portion of a multistage flash heat exchanger illustrating the use of a U-tube as the pressure control device.
Figure 6:
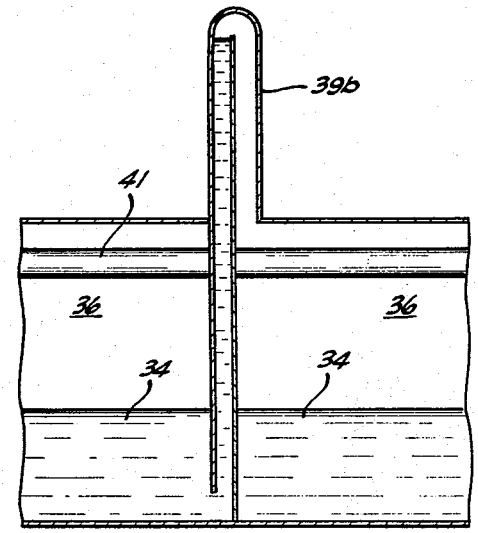
FIG. 6 is a vertical cross-sectional view of a portion of a multistage flash heat exchanger illustrating the use of an inverted U-tube as the pressure control device.

The pressure control between adjacent stages can be provided in several ways. As discussed in greater detail above, the pressure control device can be a weir-type gate as shown in FIG. 2. FIG. 3 illustrates the use of orifice 35 to provide the pressure differential between adjacent stages. FIG. 4 depicts a pressure control device consisting of pressure controller 37 which operates pressure control valve 38 to maintain the proper pressure in the flash stage. Alternative embodiments of the weir-type pressure control device of FIG. 2 are disclosed in FIG. 5 and FIG. 6. FIG. 5 illustrates the use of a U-tube as the pressure control device in which U-tube 39a effects the pressure differential between adjacent stages by maintaining a column of brine between the stages. The pressure control device of FIG. 6 is an inverted U-tube 39b, and is basically an extended weir-type gate. As in the weir-type pressure control device, the pressure differential between stages is maintained by the column of brine in the U-tube. The U-tubes of FIG. 5 and FIG. 6 may also be constructed as concentric pipes if desired.

In the practice of the method of this invention, it is preferred that the temperature of the brine entering the first flash stage be above about 250° F., more preferably above about 300° F., and most preferably above about 350° F. Since one important benefit provided by the method of this invention results from the incremental reductions in vapor temperature, it is desired to maintain the pressures in the flash stages such that the brine is cooled by not more than about 35° F. per flash stage, and preferably between about 1° F. and 10° F. per flash stage. It is also preferred that the geothermal brine in the last flash stage be cooled to below about 150° F.

The invention is further described by the following example which is illustrative of a specific mode of practicing the invention and is not intended as limiting the scope of the invention as defined by the appended claims.

EXAMPLE

Hot geothermal brine is produced from a subterranean geothermal brine reservoir via a production well at a pressure exceeding the brine's vapor pressure to maintain the brine in the liquid phase. The brine is then conducted, under a superatmospheric pressure sufficient to prevent flashing, to the first flash stage of a multistage flash heat exchanger. The brine is introduced into the first flash stage at a temperature of 460° F.

Figure 7:
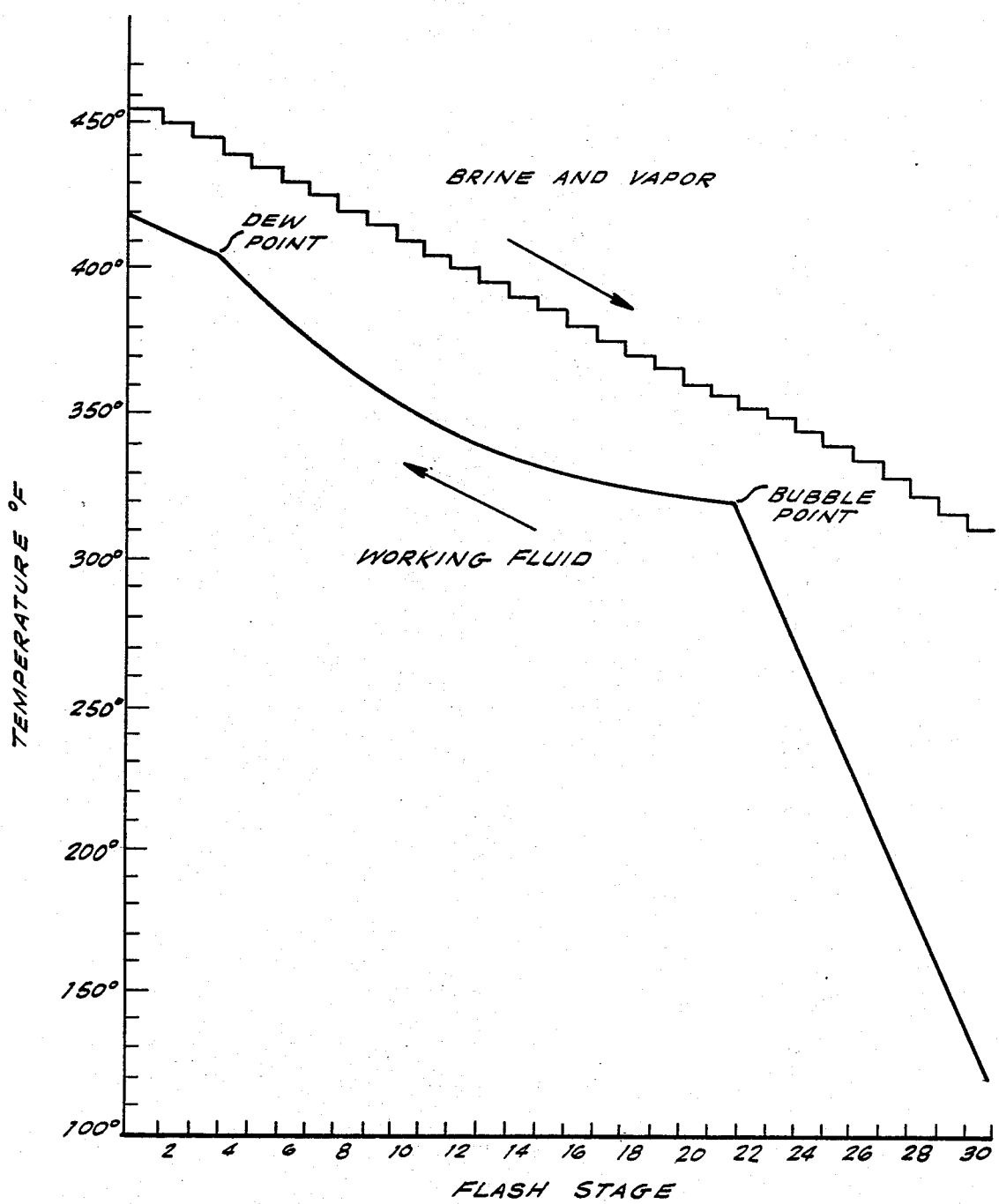
FIG. 7 is a graph showing the temperature of the brine, the vapor, and the working fluid as a function of their location in an exemplary multistage flash heat exchanger.

The pressure in the first flash stage is maintained lower than the vapor pressure of the entering brine so that the brine will partially flash. The pressure is so maintained that the temperature of the brine drops to 455° F. Referring now to FIG. 7, the first flash stage now contains brine and vapor at 455° F. The brine then flows through the pressure control device, and into the second flash stage. The second flash stage is also maintained at a pressure lower than the vapor pressure of the entering brine. The brine flashes to a temperature of 450° F., 5° lower than the brine in the first stage. This process continues for another 28 stages for a total of 30 flash stages, wherein the brine partially flashes in each stage and wherein the temperature of the brine drops by about 5° F., per stage, so that the temperature of the brine in the last stage is 310° F.

The working fluid utilized in this example is a binary fluid consisting of about 80 percent water and 20 percent ammonia. As shown in FIG. 7, the working fluid enters the thirtieth flash stage at a temperature of 120° F. and the vapor contacting the heat exchange conduit in this stage is at a temperature of 310° F. The vapor condenses on the exterior surface of the conduit, yielding its heat of condensation to the working fluid by indirect heat exchange. As the working fluid flows through the first nine flash stages, the temperature increases to the bubble point temperature of 320° F., at which temperature the fluid first begins to vaporize. Through the next 18 flash stages, the working fluid is heated to progressively higher temperatures and further vaporized until, after passing through 18 flash stages, all the liquid has vaporized and is at the dew point temperature of 405° F. The working fluid then flows through the final 3 stages in which the vapor is superheated, and then delivered to a turbine which produces the mechanical energy necessary to drive the electrical generator.

Various embodiments and modifications of this invention have been described in the foregoing description, and further modifications will be apparent to those skilled in the art. Such modifications are included within the scope of this invention as defined by the following claims.

Having now described the invention, I claim:

1. A method for producing mechanical energy from geothermal brine, which comprises:
    producing hot geothermal brine from a subterranean geothermal reservoir;
    passing said brine successively through a series of separate flash stages, wherein each successive stage is maintained at a lower pressure less than the vapor pressure of the brine entering that stage so that the brine is partially flashed to vapor in each stage;
    countercurrently flowing a working fluid successively through said series of flash stages in indirect heat exchange with the vapor produced in each flash stage, whereby the vapor is condensed in each stage and the working fluid is progressively heated as it passes through said series of flash stages; and
    utilizing said working fluid in a heat engine to produce mechanical energy.

2. The method defined in claim 1 wherein the geothermal brine is produced and conducted to the first stage of said series of flash stages at a pressure exceeding its vapor pressure to maintain the brine in the liquid phase prior to its introduction into said first flash stage.

3. The method defined in claim 1 wherein the geothermal brine is partially flashed to vapor prior to its introduction into the first stage of said series of flash stages, and wherein the residual brine from this partial flashing is introduced into said first flash stage.

4. The method defined in claim 1 wherein the temperature of the geothermal brine introduced into the first stage of said series of flash stages is above about 250° F.

5. The method defined in claim 1 wherein the pressure in each stage of said series of flash stages is maintained so that the brine is cooled by not more than about 35° F. per flash stage.

6. The method defined in claim 1 wherein the pressure in each stage of said series of flash stages is maintained so that the brine is cooled between about 1° F. and 10° F. per flash stage.

7. The method defined in claim 1 wherein the pressure in at least the last stage of said series of flash stages is subatmospheric.

8. The method defined in claim 1 wherein all the vapor condensed in each stage of said series of flash stages is recombined with the brine in that stage.

9. The method defined in claim 1 wherein at least a portion of said working fluid is vaporized as it passes through said series of flash stages.

10. The method defined in claim 1 wherein the working fluid is a binary fluid.

11. The method defined in claim 1 wherein the pressure differential between adjacent flash stages is maintained by flowing the brine from the upstream flash stage to the downstream flash stage through a column of brine which exerts a hydrostatic pressure upon the upstream flash stage.

12. A method for producing mechanical energy utilizing geothermal brine, which comprises:
    producing hot geothermal brine from a subterranean geothermal reservoir and conducting said brine to the first stage of a series of separate flash stages at a pressure exceeding its vapor pressure to maintain the brine in the liquid phase;
    passing said brine successively through said series of flash stages, wherein each successive stage is maintained at a lower pressure less than the vapor pressure of the brine entering that stage so that the brine is partially flashed to vapor in each flash stage and so that the brine is cooled by not more than about 35° F. per flash stage, and wherein all the vapor condensed in each stage is recombined with the brine in that stage;
    countercurrently flowing a working fluid successively through said series of flash stages in indirect heat exchange with the vapor produced in each flash stage; and
    utilizing said working fluid in a heat engine to produce mechanical energy.

13. The method defined in claim 12 wherein the temperature of the geothermal brine introduced into the first stage of said series of flash stages is above about 250° F.

14. The method defined in claim 12 wherein the pressure in at least the last stage of said series of flash stages is subatmospheric.

15. The method defined in claim 12 wherein the pressure differential between adjacent flash stages is maintained by flowing the brine from the upstream flash stage to the downstream flash stage through a column of brine which exerts a hydrostatic pressure upon the upstream flash stage.

16. The method defined in claim 15 wherein the pressure in each stage of said series of flash stages is maintained so that the brine is cooled between about 1° F. and 10° F. per flash stage.

17. The method defined in claim 12 wherein the working fluid is a binary fluid.

18. The method defined in claim 12 wherein at least a portion of said working fluid is vaporized as it passes through said series of flash stages.

19. A method for generating electrical power utilizing geothermal brine which comprises:
    producing hot geothermal brine from a subterranean geothermal reservoir, and conducting said brine to the first stage of a series of separate flash stages at a temperature above about 250° F. and at a superatmospheric pressure exceeding the vapor pressure of the brine so that the brine is maintained in the liquid phase;
    passing said brine successively through said series of flash stages, wherein each successive stage is maintained at a lower pressure less than the vapor pressure of the brine entering that stage so that the brine is partially flashed to vapor in each flash stage and so that the brine is cooled between about 1° F. and 10° F. per flash stage, and wherein all the vapor condensed in each stage is recombined with the brine in that stage;
    countercurrently flowing a binary fluid successively through said series of flash stages in indirect heat exchange with the vapor produced in each flash stage, and wherein at least a portion of said fluid is vaporized; and utilizing said binary fluid to drive a turbine for electrical power generation.

20. The method defined in claim 19 wherein the pressure differential between adjacent flash stages is maintained by flowing the brine from the upstream flash stage to the downstream flash stage through a column of brine which exerts a hydrostatic pressure upon the upstream flash stage.

21. The method defined in claim 19 wherein the binary fluid is completely vaporized upon leaving said series of flash stages.

22. The method defined in claim 19 including the steps of condensing the binary fluid discharged from the turbine, and returning the binary fluid to said series of flash stages in a closed fluid circuit.

* * * * *